United States Patent
Thrall et al.

(10) Patent No.: US 7,860,878 B2
(45) Date of Patent: Dec. 28, 2010

(54) PRIORITIZING MEDIA ASSETS FOR PUBLICATION

(75) Inventors: John Thrall, San Francisco, CA (US); Michael Elliott, San Carlos, CA (US); Owen Pingchi Cheung, Hillsborough, CA (US); Brian Evan McMullin, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 368 days.

(21) Appl. No.: 12/036,970

(22) Filed: Feb. 25, 2008

(65) Prior Publication Data

US 2009/0216741 A1 Aug. 27, 2009

(51) Int. Cl.
  G06F 7/00 (2006.01)
  G06F 17/30 (2006.01)
(52) U.S. Cl. ...................... 707/766; 707/806
(58) Field of Classification Search ......... 707/600–831; 709/203; 715/201, 202, 210, 254, 255, 256
  See application file for complete search history.

(56) References Cited

U.S. PATENT DOCUMENTS

| 7,051,023 | B2 | 5/2006 | Kapur et al. | |
| 7,346,606 | B2 * | 3/2008 | Bharat | 1/1 |
| 2003/0120653 | A1 | 6/2003 | Brady et al. | |
| 2003/0144898 | A1 | 7/2003 | Bibelnieks et al. | |
| 2004/0003096 | A1 * | 1/2004 | Willis | 709/228 |
| 2004/0111467 | A1 * | 6/2004 | Willis | 709/203 |
| 2004/0267723 | A1 | 12/2004 | Bharat | |
| 2005/0033771 | A1 | 2/2005 | Schmitter et al. | |
| 2008/0168185 | A1 * | 7/2008 | Robbin et al. | 709/248 |
| 2008/0168526 | A1 * | 7/2008 | Robbin et al. | 725/139 |

FOREIGN PATENT DOCUMENTS

KR  10-0671284  1/2007

OTHER PUBLICATIONS

Chung-Sheng Li et al., Multimedia content description in the InfoPyramid, 1998, IEEE, vol. 6, 3789-3792.*
Sekiguchi et al., Topic Detection from Blog Documents Using Users' Interests, 2006, IEEE, 108-110.*
McArthur et al., The ranking of query refinements of interactive web-based retrieval, 2000, ACM, 4 pages.*
Notification of Transmittal of the International Search Report and The Written Opinion of the International Searching Authority dated Aug. 24, 2009 from International Application No. PCT/US2009/034710, All Pages.

* cited by examiner

*Primary Examiner*—Jean B Fleurantin
(74) *Attorney, Agent, or Firm*—Weaver Austin Villeneuve and Sampson LLP

(57) ABSTRACT

Methods and apparatus are described by which media assets may be prioritized and published in accordance with current topics of interest derived from a dynamic data set representing the online activity of a relevant population of users.

20 Claims, 2 Drawing Sheets

PRIORITIZING MEDIA ASSETS FOR PUBLICATION

BACKGROUND OF THE INVENTION

The present invention relates to the publication of media assets and, in particular, techniques for prioritizing media assets for publication.

Publication of media assets occurs in many different contexts and involves different types of content. In most contexts there are constraints on how many assets can be presented or displayed to the user, and on how those assets are displayed (e.g., location on a page, time of day, etc.).

In the case of a daily newspaper, the available media assets might be a set of articles. To publish a particular day's edition, a subset of available articles are chosen with certain articles being excluded due to space constraints, cost, editorial policies, etc. Articles intended to receive the most emphasis are typically placed in prominent positions on the front page of the newspaper.

In the case of a television station that sets its programming lineup on a weekly basis, the available media assets might be a set of shows, series, and movies. To create a particular week's schedule, a subset of these shows are selected and mapped to a 7 day by 24 hour grid.

In the case of an Internet media property, the assets may be URLs and article summaries. Articles intended to receive the most emphasis often appear at the top of the Internet media property home page. Because an Internet media property may be changed at arbitrary time intervals, media publishing can be considered an almost continuous process in which changes in article selection and article emphases reflect changing prioritization of media assets.

Conventionally, media publishing has required direct human involvement in the content programming process. Typically, an editor with an understanding of the target audience (e.g., readers for newspapers and magazines, viewers for television, listeners for radio, etc.) would select content for publication and determine how those assets were to be displayed. Fundamental trends in media creation and consumption are marginalizing the role of the human editor in many of these applications.

For one thing, the number of assets available for programming has increased (and continues to increase) exponentially. Increased digitization of media, improved tools for content licensing, new standards like RSS for content sharing, and the rise of user generated content (blogs, micropublishing, Flickr, YouTube) all contribute to these increases. It is now impossible in many cases for a human editor or editorial staff to even be aware of all of the relevant media assets, much less prioritize them for publication.

In addition, the expectation of users for fresh, personally relevant content has also increased. Fragmentation of media sources combined with easy access to those media sources through the Internet and various search technologies give users unprecedented control over the types of content they consume. Ubiquitous connectivity to news websites, real-time communication channels, television, and radio has reduced information cycle times from hours to seconds. These phenomena pose further challenges for publishing models based on human editorial resource in that satisfying these expectations effectively requires instantaneous knowledge of audience interests, and the ability to customize content delivered to various segments of that audience, all the way down to the individual user. While it may be possible to publish media at close to real time (5-10 minute increments) using a human editor approach for very large audiences (e.g., viewers of the Yahoo! homepage, CNN, etc.), it is not feasible to do so for the smaller audiences associated with high personal or regional relevance.

One set of solutions to this media publishing problem can be referred to as "interactive media." In interactive media, the work of the human editor is effectively distributed to the end consumer. In its most extreme form, the available media assets are stored in a search index and it is up to the user to decide the content they are interested in, type in a search query, and select from the search results. Other interactive media solutions provide the end consumer with the ability to "subscribe" to media assets from selected sources (e.g., RSS feeds, "My sources," etc.), or provide a list of keywords of interest (e.g., for news alerts, etc.). These solutions act as filters on the underlying sets of media assets.

Another set of solutions can be characterized as editor productivity tools. These are technology systems and publishing models that seek to reduce the work needed for editors to prioritize content. Examples include categorization systems that provide structured views of available media assets, cluster related media assets, provide alerts on breaking events, etc. Other examples include the use of aggregation systems to re-syndicate media publishing decisions made by others such as, for example, media publishers with a particular expertise, e.g., a geographical market expertise for a region, city, town neighborhood, etc., or an expertise for particular subject matter, e.g., sports, entertainment, finance, etc.

One approach employed by a major online news site looks at the aggregation of articles from many sources to determine a prioritization of stories based on factors like how many articles are being written on a particular topic. This can be considered an example of an editor productivity tool (specifically, aggregation) taken to the extreme of removing the editor all together.

Another approach employed by a well known aggregator site determines a prioritization of web pages/articles based on the number of users who save or bookmark that web page or article. This is a variant of the "interactive media" solution which engages users outside of the website site for the purpose of helping to prioritize and select content on the website.

Some websites have implemented systems that prioritize media assets by allowing users to rate stories, or vote stories "up" or "down." These and similar approaches may also be characterized as "interactive media" approaches in which the action of one or more users can potentially change the media published (prioritization and/or selection) for users other than those who rated or voted on the stories. In addition to explicit rating or voting, some websites achieve similar results with implicit rating or voting, e.g., the reordering of articles based on click-through-rate, changing television programming based on viewer numbers, or providing lists of "most popular" or "most emailed" content.

Unfortunately, these approaches still fall short of being able to present relevant content to users on a scale which corresponds to the rate at which content is now produced.

SUMMARY OF THE INVENTION

According to the present invention, techniques are provided by which media assets may be prioritized and/or published in accordance with current topics of interest derived from a dynamic data set representing the online activity of a population of users. According to one class of embodiments, methods and apparatus are provided for prioritizing a plurality of media assets. The media assets are ranked with reference to text associated with each media asset and current interest data. The text represents subject matter to which the associated media asset relates. The current interest data were generated from a dynamic data set representing actions by a population of users. The current interest data represents a plurality of topics of interest associated with the population of users and changes in the topics of interest over time.

According to another class of embodiments, methods and apparatus are provided for publishing a plurality of media assets. Presentation of one or more of the media assets to a first user in accordance with a ranking of the plurality of media assets is facilitated. The ranking was computed with reference to text associated with each media asset and current interest data. The text represents subject matter to which the associated media asset relates. The current interest data were generated from a dynamic data set representing actions by a population of users. The current interest data represents a plurality of topics of interest associated with the population of users and changes in the topics of interest over time.

A further understanding of the nature and advantages of the present invention may be realized by reference to the remaining portions of the specification and the drawings.

DETAILED DESCRIPTION OF SPECIFIC EMBODIMENTS

Figure 1:
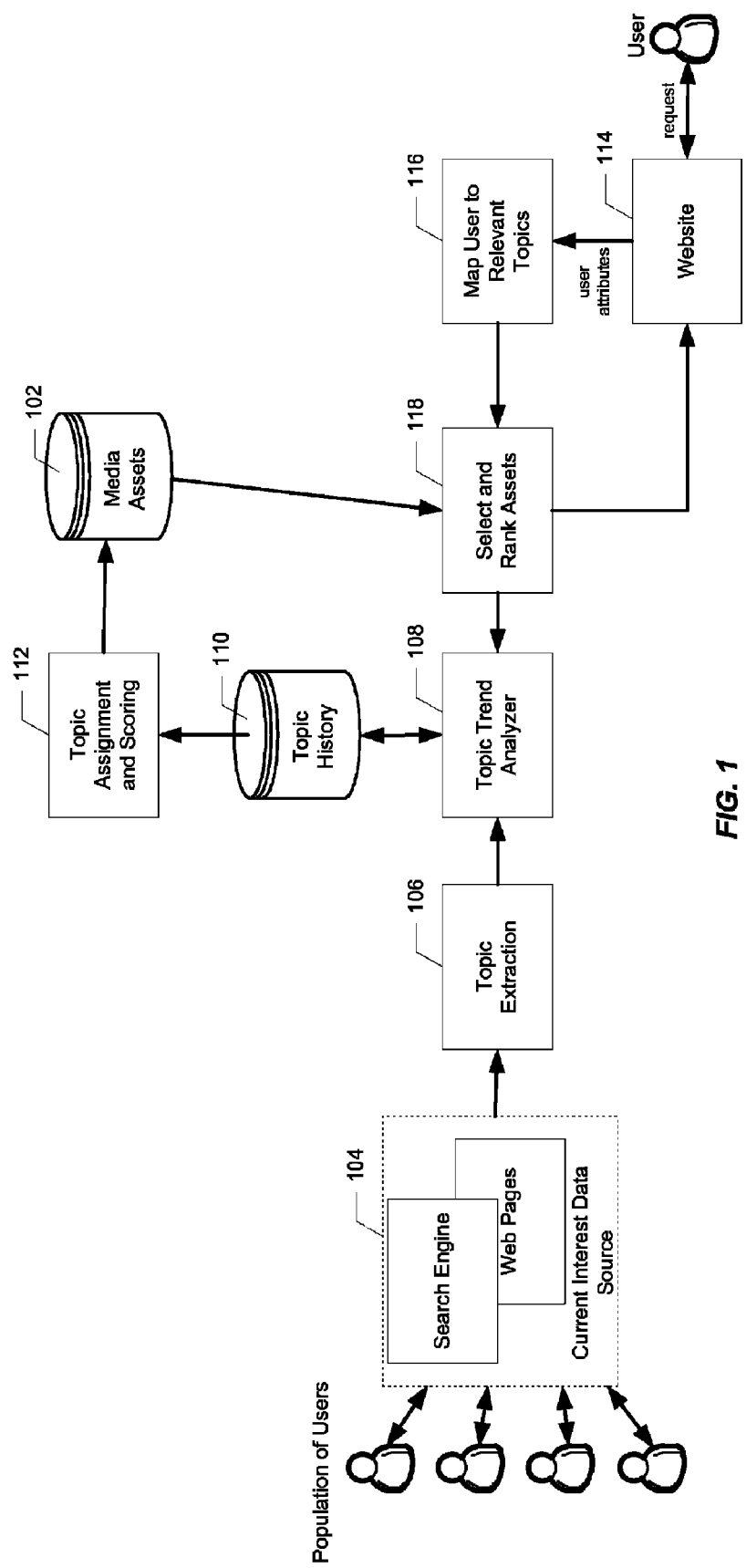
FIG. 1 is a flow diagram illustrating a process of prioritizing media assets according to a specific embodiment of the invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Embodiments of the present invention enable automation of the prioritization of media assets for publication. Various of these embodiments rely on two basic and overlapping concepts. First, the problem of content selection and evaluation is treated as a text-based information retrieval problem. Second, an automated mechanism is provided which allows a large audience to participate in prioritizing media assets in a way which promotes an understanding of current topics of interest. Specific implementations do this in a way which enables segmentation of prioritization to arbitrary audience segments. As will be understood with reference to the following description, embodiments of the invention enable automated publishing mechanisms that can scale to any number of media assets, can be optimized for audience sizes ranging from entire populations to a single individual, and/or have update cycles that are not limited by human editorial resources.

As used herein the term "media asset" refers to any representation of content which may be stored electronically including, for example, text, images, audio, video, combinations of these, etc. In addition, the term "topic" refers to any summary way of characterizing subject matter which promotes an understanding of the substance of the subject matter to which it is applied.

According to a specific class of embodiments, media assets are treated as text documents including a bundle of keywords and associated non-keyword attributes. The bundle of keywords can be further broken down by an indication of the importance of the keyword for that document. For example, in a typical news article, keywords in the title of the article and first paragraph can be given high importance, keywords provided as "tags," metadata, or "special descriptions" can be given very high importance, and keywords in the body of the article can be given relatively low importance. Other ways to determine the importance of a keyword might include, for example, looking at the number of occurrences of the keyword, or how rare a keyword is compared to all keywords from all media assets.

The associated non-keyword attributes capture keyword-independent aspects of the media asset that may be important for prioritization. For example, if a news article has an associated image, this may be treated as an indicator of the relative importance of the article. In addition, the age of the article and the quality or trustworthiness of the original source of the article may also be used as indicators of importance or relevance. Other non-keyword attributes combine implicit (e.g., views/clicks) and explicit (e.g., voting/rating) input as part of the final prioritization and selection algorithm. Another non-keyword attribute could be how well the text is written as determined, for example, by some measure of conformance to grammatical rules.

According to various embodiments of the invention, this text document representation of the media asset is leveraged to select and prioritize content for publishing. Current topics of interest for a given audience are determined with reference to online activity of a user population, and then matched against the available media assets, a score for each media asset based on these topic-keyword matches and associated attributes being used as a basis for prioritization. According to some embodiments, the system may assign multiple scores to each media asset, each score representing how well the asset measures against a specific attribute. Individual scores may be subsequently combined to generate an overall score based on which attributes are of interest to a given user. An example may be instructive.

Assume that the available media assets for publication include Article A, Article B, and Article C, and there is a constraint that only one article can be published at a time. Article A has the following keyword and non-keyword attributes:

| | |
|---|---|
| First paragraph | President Bush Speaks |
| Second paragraph | President Bush spoke to reporters today . . . |
| Source Quality | 99 |

Article B has the following keyword and non-keyword attributes:

| | |
|---|---|
| First paragraph | President Bush Speaks |
| Second paragraph | President Bush spoke to reporters today . . . |
| Source Quality | 10 |

Article C has the following keyword and non-keyword attributes:

| First paragraph | Traffic accident on I-80 |
|---|---|
| Second paragraph | Traffic was backed up on I-80 after a big rig . . . |
| Source Quality | 50 |

If it is known that the target audience is currently interested in the topic "President Bush," and has no interest in "Traffic" or "I-80," Article A and Article B would appear to have equal relevance based on a keyword match for the topic "President Bush," while Article C would appear to have no relevance based on keyword match. This might result in topic interest scores for each article as follows:

| Article A | Topic Interest Score 100 (President Bush) |
|---|---|
| Article B | Topic Interest Score 100 (President Bush) |
| Article C | Topic Interest Score 5 (Traffic I-80) |

As shown, Articles A and B have equal topic interest scores because they are both about "President Bush" and the topic "President Bush" happens to be of high interest at the moment. "Traffic I-80" on the other hand is currently of low interest and therefore Article C has a low topic interest score. And because Article A has a higher source quality it would be selected over Article B in terms of publication priority.

Now consider the case where either the target audience changes and/or the topics of interest change such that the audience is now exhibiting a current interest in the topic "I-80," and no longer appears to have a current interest in "President Bush." This could occur, for example, because the system is being asked to publish for a different audience. In addition or alternatively, it could occur because rush hour has started and the original "President Bush" audience has changed interest. In this case, Article C would now score higher and be selected over Articles A and B in terms of publication priority. That is, as the interests of users change, the topic interest scores for each asset change, and therefore the topic component by which prioritization and/or selection algorithms rank and publish the media assets.

The foregoing example is a very simple case to illustrate some of the basic concepts of the present invention. It will be understood that the attributes considered, the manner in which they are derived, and the manner in which their corresponding contributions are weighted and combined may vary considerably without departing from the scope of the invention. For example, within the domain of this example, various relative weights could be given to keyword matches in different sections of the article (e.g., title, first paragraph, second paragraph, etc.). Relative weights may also be based on the proximity of keywords in the article, the number of occurrences of keywords, etc. Similarly, associated non-keyword attributes can be combined in various ways to contribute to the scoring of articles. Moreover, current topics of interest for a target audience can be expressed and integrated into the scoring algorithm in a wide variety of ways. One example would be to express current topics of interest as a vector of keywords with various weights. So, in the example described above, the keyword vector might include the following: <"President Bush"—100; "Traffic"—25; "I-80"—45>. Other suitable representations will be apparent to those of skill in the art.

According to various embodiments of the invention, an automatic mechanism is provide which allows a very broad audience to participate in prioritizing media assets in a way which also enables segmentation of prioritization to arbitrary audience segments. As discussed above, by treating media assets as text documents we are able to apply any of a wide variety of information retrieval techniques for selection, evaluation, and prioritization. According to a particular class of embodiments, scalable, automated prioritization and publishing of media assets is enabled by collecting data indicative of audience interest in near-real-time, and by representing current audience interest in a format that also allows for the use of text-based information retrieval techniques. According to a specific embodiment, the data representing current interest are derived from search logs, although many other suitable sources exist.

Search logs contain search queries entered by users searching for information on, for example, a web-based search engine such as that provided by Yahoo! Inc. of Sunnyvale, Calif. By monitoring the frequency of keywords in search logs over time, trends in audience interest in particular topics may be identified. These topics may then be represented as keywords or phrases with associated weights which are updated over time as audience interest changes. This information may then be used to facilitate prioritization of available media assets in a way which reflects what are currently the most interesting topics to a given audience. An example of a simplified search log data might be as follows:

| | Time | | | | | | | | | |
|---|---|---|---|---|---|---|---|---|---|---|
| | 1 | 2 | 3 | 5 | 9 | 11 | 12 | 13 | 14 | 20 |
| Query | dog | dog | dog | cat | dog | cat | cat | dog | cat | dog |

Suppose the system is configured to sample search log data in time windows having an increment of 10. In the time period T=1 . . . 10, the search query "dog" occurs with a frequency of 4, and "cat" with frequency of 1. The relative frequency for T=1 . . . 10 for dog =$4/5$=0.8, and for cat=$1/5$=0.2. For T=11 . . . 20, the relative frequency for dog=0.4, and for cat=0.6. From these data, the current audience interest for T=1 . . . 10 may be represented as a vector <dog—80; cat—20>, and for T=11 . . . 20 as a vector <dog—40; cat—60>. Using this information, available media assets may be prioritized using a scoring algorithm as described above to determine a relative priority of assets to publish. According to one approach, for T=1 . . . 10 dog articles would be prioritized more highly, and for T=11 . . . 20 cat articles would be prioritized more highly. However, alternative approaches may take additional information into account in the scoring.

For example, in search log data some terms are known to be more likely to occur than others. Examples include shorter terms, terms that are less likely to be misspelled, terms that are always popular, etc. Embodiments of the invention are therefore contemplated in which mechanisms are introduced to account for this. So, for example, assume that for the cat and dog example described above that the search log data indicate that for T=−1000000. . . 1000000, the average long term observed relative frequency for dog is 0.8 and for cat is 0.1. Therefore, even though the relative frequency in time period T=1 . . . 10 for cat is 0.2 which is less than the relative frequency for dog at 0.8, we now have information that indicates that the relative frequency of 0.2 for cat is actually high for that term. That is, compared to the long term relative frequencies, the relative frequency for cat during the time period of interest is twice its long term average, while the relative frequency for dog during that same time period is at its long term average. So, by introducing some level of normalization into the scoring algorithm, e.g., by dividing the current frequency by the long term average, the system can be configured to account for the unusually high interest in cat for time period T=1 . . . 10, even though the number of queries for dog is higher. In addition, and depending on what is appropriate for a particular media publishing application, the long term relative frequency for specific terms can be weighted more or less.

Increasing sensitivity to deviation from long term averages results in a process for prioritization of media assets that is able react quickly to changes in audience interest. Examples of other mechanisms for manipulating the reaction time of the process include changing the time increment windows used to gather current interest data such a keyword frequency. Alternatively, or in addition, the time increment windows used to calculate long term averages may be manipulated. Other methods include time series analysis, change above moving averages, etc.

Operation of a specific embodiment of the invention will now be described with reference to FIG. 1. A media asset repository 102 stores the media assets to be prioritized and published. Repository 102 may store the media assets themselves (e.g., html files, video files, audio files, text files, virtually any type of media) and/or more distilled representations of the media assets (e.g., keywords and non-keyword attributes in a particular format).

Also included is a current interest data source 104 which allows the actions of a population of users to be employed to identify topics of interest. In one set of embodiments, the population corresponds to users of Yahoo! Search whose aggregate search trends (e.g., relative frequency of occurrence of topics in searches) as represented in search logs are used to construct a weighted keyword vector that effectively captures audience interest.

However, it should be noted that other embodiments of the invention allow for a much broader range of mechanisms by which the actions of a population of users may be employed to identify topics of interest. That is, virtually any user activity that can be associated with keywords or from which keywords can be derived can be used to generate current audience interest data. For example, a mechanism for observing pages visited by a user can be used to discern potential audience interest using various known techniques for extracting text (including keywords) from web pages (e.g., metadata fields, parsing the page text, anchor text, image analysis, etc.). According to some embodiments, the output of this process is a body of text from which topics of interest are then extracted (106).

During topic extraction 106, an input stream of words and phrases from current interest data source 104 is analyzed to identify topics of interest. Sometimes these topics may correspond to traditional entities such as, for example, people, places, or things. Topics may also represent statements about such entities or even abstract concepts. Examples of topics are "President Bush," "2008 Olympics," or "Huge snowstorm in China."

One way to extract the relevant information is to look at the relative frequencies for each word combination in the data and split them into pieces (i.e., individual words) if the count exceeds a certain threshold. More generally, and as will be understood by those skilled in the art, a number of existing techniques for mining and disambiguating search log data may be employed without departing from the scope of the invention. Unit analysis is an example of a class of techniques which allows for identifying phrases and treating them as a single topic. For example, "george bush" appearing in the query log would add to the observed frequency of "george bush" but not to the observed frequency of "george" or "bush." Additional details about such techniques are provided in U.S. Pat. No. 7,051,023 entitled SYSTEMS AND METHODS FOR GENERATING CONCEPT UNITS FROM SEARCH QUERIES, the entire disclosure of which is incorporated herein by reference for all purposes.

Once the topics of interest are identified, trend analyzer 108 determines which topics are of interest to users, and identifies trends in audience interest, and stores this information in topic history repository 110. There are many different ways in which this can be achieved. A simple interest measure is the absolute number of people looking for a given topic over a certain period of time. A more sophisticated approach computes a moving average of the magnitude of the topic over different time periods, e.g., a 10-period moving average and a 30-period moving average. When the faster 10-period trend crosses upwards over the slower 30-period trend, it can be inferred that the topic is gaining in popularity. Yet another approach combines a moving average and the normal volatility of the topic. If that topic exceeds a threshold such as two standard deviations above the normal average, it can be inferred from this unusual event that the topic is interesting. Regardless of the techniques employed, what results is a variety of statistics and historical trends computed for each topic.

There are significant advantages to having an automated mechanism for discerning the evolving interests of a population of users. First, it enables the capture of a breadth of information that is simply not practicable when reliance is on human editorial resources. Second, where demographic data representing the population of users is available (e.g., as for members of the Yahoo! network), the topics of interest for any arbitrary segment of that population may also be tracked. That is, identification of topics of interest may be done for any demographic slice of the population of users for which demographic data are available. Such demographic data might include, for example, age, gender, socioeconomic status, geographic location and/or region, interest group, etc. Virtually any attribute or combination of attributes associated with the individuals in the population of users may be employed to identify the topics which are likely of interest to a particular target audience, as well as to prioritize and publish media assets to that audience. An example may be illustrative.

In the Yahoo! network all user actions can be associated with user attributes. For example, it is possible to determine the geographic location of users who are searching. Using this knowledge, the relative frequency and long term observed relative frequency for specific topics or keywords may be computed for arbitrary user locations, e.g., U.S. users vs. French users). By segmenting the user input in this way, distinct asset prioritizations may be effected for different user locations. As mentioned above, this approach extends for any arbitrary segmentation of users including the most general "all user" audience case right down to the "single user" audience case.

Referring once again to FIG. 1, based on the trend analysis, the media assets in repository 102 are assigned topics and scores (block 112). Topic assignment may be done in a wide variety of ways which range from static approaches in which one or more topics are assigned to a given media asset one time, to more dynamic approaches in which new topics might be associated with a given media asset over time as topics of interest change. The right balance between such static and dynamic approaches may vary for different applications.

In general, there are a wide variety of techniques which can be applied to optimize the scoring of media assets with reference to current interest data. For example, the weights employed by the scoring algorithm for the different score components may be manually set and manipulated to yield subjectively good result. In addition, or alternatively, the user population may be segmented with each "bucket" using a different algorithm. The performance of each bucket against the other buckets and a control bucket may then be evaluated for system optimization. A wide variety of techniques and tools known to those of skill in the art (e.g., Machine Learned, Linear Regression, Term Frequency-Inverse Document Frequency (TFIDF), etc.) may be employed to facilitate such optimization.

And depending on the nature of the media assets being scored, the attributes and weighting schemes employed may also vary considerably. Furthermore, both static and dynamic components may be included in a scoring algorithm. For example, a static component might depend on static attributes of the media asset itself, whereas a dynamic component might relate to evolving topics of interest against which the media asset is scored. In any case, the scores for the various media assets in the repository are repeatedly updated to reflect new information that becomes available regarding trends in topics of interest. As will be understood, the update cycle time, whether periodic or asynchronous, is not limited by the traditional bottleneck of human editorial resources.

According to one class of embodiments, the presentation of media assets to a user occurs in response to a request for one or more media assets either expressly generated by the user, or in response to actions by the user on, for example, a web site 114. Attributes associated with the user (e.g., user demographic data) are mapped to a set of relevant topics that user might find interesting (116). The highest scoring media assets relative to the topic set are then identified and ranked (118), and presented to the user in accordance with any constraints associated with web site 114. This might involve providing a ranked list of media assets similar to a search results page. Alternatively, it might involve presentation or playing of the media asset(s) automatically without further user input.

It should be noted that embodiments of the invention are contemplated in which the demographics of the specific user to whom media assets are being published are not necessarily taken into account. That is, media assets may be prioritized and published for any arbitrary audience, and the invention should not be limited to implementations which employ an individual user's attributes to personalize presentation of the assets in the manner described above.

Figure 2:
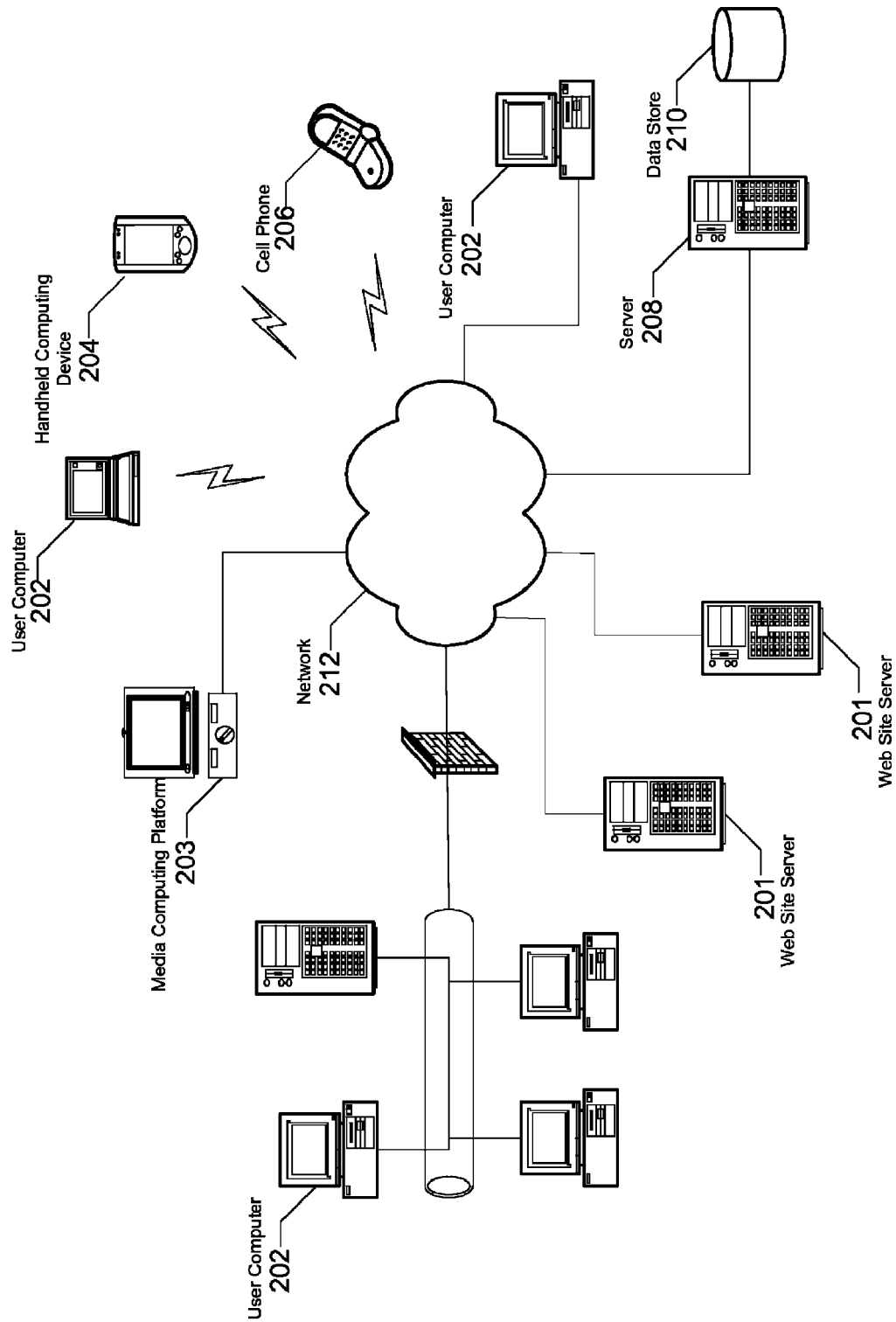
FIG. 2 is a simplified representation of a network and computing environment in which embodiments of the present invention may be implemented.

Embodiments of the present invention may be employed to determine current topics of interest, and to prioritize and/or publish media assets with reference to the topics of interest in any of a wide variety of computing contexts. For example, as illustrated in FIG. 2, implementations are contemplated in which a population of users interacts with the Internet and/or the World Wide Web (e.g., web sites 201) via a diverse network environment using any type of computer (e.g., desktop, laptop, tablet, etc.) 202, media computing platforms 203 (e.g., cable and satellite set top boxes and digital video recorders), handheld computing devices (e.g., PDAs) 204, cell phones 206, or any other type of computing or communication platform. The population of users may include those whose interactions are used to derive current topics of interest, as well as those for whom media assets are prioritized and/or published in accordance with the invention.

And according to various embodiments, current interest data employed by embodiments of the invention may be of a wide variety of types and may be collected using a wide variety of techniques. For example, as described above, such data may be derived from search logs maintained by search engine providers. Alternatively, current interest data may be derived from a wide range of interactions of users with the Internet, e.g., the nature and content of web pages visited, the manner in which the users interact with web pages, etc. More generally, the interaction of the population of users with any type of software application or graphical user interface, whether resident on the users' machines are accessed remotely, may be used for this purpose.

Once collected, current interest data may be processed and media assets may be prioritized in some centralized manner. This is represented in FIG. 2 by server 208 and data store 210 which, as will be understood, may correspond to multiple distributed devices and data stores. It should also be noted that embodiments of the invention are contemplated in which various functionalities described herein are under the control of different entities. For example, the capture of keywords in search logs, the identification of topics of interest, the prioritization of media assets, and the publication of media assets could each be under the control of a separate entity. The invention may also be practiced in a wide variety of network environments including, for example, TCP/IP-based networks, telecommunications networks, wireless networks, etc. These networks are represented by network 212. Media assets prioritized according to the invention may then be provided to users in the network via the various channels by which the users interact with the network.

In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

While the invention has been particularly shown and described with reference to specific embodiments thereof, it will be understood by those skilled in the art that changes in the form and details of the disclosed embodiments may be made without departing from the spirit or scope of the invention. For example, any media can be prioritized and/or published according to the invention as long as text or keywords can be associated with or derived from the media. So, for non-text assets, e.g., images, audio, video, this information could be in tags or metadata. For audio or video, this information could even be derived by the application of speech recognition techniques.

In addition, examples described above relate to a simplistic case using relative frequency of occurrence of keywords in time series data. However, it will be understood that more sophisticated techniques such as those prevalent in stock trading and chart analysis may be employed without departing from the scope of the invention.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method for prioritizing a plurality of media assets, the method comprising
    identifying text associated with each media asset, the text representing subject matter to which the associated media asset relates;
    determining data relating to current interest topics, the current interest topics data having been generated from a dynamic data set,
    wherein the dynamic data set changes over time and represents actions by a population of users involving user interactions with one or more of a search engine, a web page or a computer application, and
    wherein the current interest topics data represents a plurality of current topics of interest associated with the population of users and changes in the topics of interest over time as the dynamic data set changes over time;
    ranking the media assets based at least in part on a comparison of the current interest topics data with the text associated with each media asset; and
    selecting a subset of the media assets based on the ranking of the media assets.

2. The method of claim 1 further comprising transmitting representations of the subset of the media assets to a first user to facilitate consumption of at least some of the subset of media assets by the first user, the representations of the subset of media assets being arranged in accordance with the ranking.

3. The method of claim 1 wherein the media assets are ranked with reference to a segment of the population of users.

4. The method of claim 1 wherein the dynamic data set represents one or more of keyword searches initiated by the population of users, interaction of the population of users with web pages, interaction of the population of users with software applications, or interaction of the population of users with graphical user interfaces.

5. The method of claim 1 further comprising repeatedly updating the ranking of the media assets in accordance with an update cycle time, the update cycle time not being limited by human editorial resources.

6. The method of claim 5 wherein the update cycle time is one of fixed, synchronous, or asynchronous.

7. The method of claim 1 wherein the media assets comprise one or more of text, audio, video, or images.

8. The method of claim 1 further comprising repeatedly extracting the current interest topics from the dynamic data set.

9. A system for prioritizing a plurality of media assets, the system comprising one or more computing devices configured to
    identify text associated with each media asset, the text representing subject matter to which the associated media asset relates;
    determine data relating to current interest topics, the current interest topics data having been generated from a dynamic data set,
    wherein the dynamic data set changes over time and represents actions by a population of users involving user interactions with one or more of a search engine, a web page or a computer application, and
    wherein the current interest topics data represents a plurality of current topics of interest associated with the population of users and changes in the topics of interest over time as the dynamic data set changes over time;
    rank the media assets based at least in part on a comparison of the current interest topics data with the text associated with each media asset; and
    select a subset of the media assets based on the ranking of the media assets.

10. The system of claim 9 wherein the one or more computing devices are further configured to transmit representations of the subset of the media assets to a first user to facilitate consumption of at least some of the subset of media assets by the first user, the representations of the subset of media assets being arranged in accordance with the ranking 11. The system of claim 9 wherein the one or more computing devices are configured to ranked the media assets with reference to a segment of the population of users.

12. The system of claim 9 wherein the dynamic data set represents one or more of keyword searches initiated by the population of users, interaction of the population of users with web pages, interaction of the population of users with software applications, or interaction of the population of users with graphical user interfaces.

13. The system of claim 9 wherein the one or more computing devices are further configured to repeatedly update the ranking of the media assets in accordance with an update cycle time, the update cycle time not being limited by human editorial resources.

14. The system of claim 13 wherein the update cycle time is one of fixed, synchronous, or asynchronous.

15. The system of claim 9 wherein the media assets comprise one or more of text, audio, video, or images.

16. The system of claim 9 wherein the one or more computing devices are further configured to repeatedly extract the current interest topics from the dynamic data set.

17. A computer-implemented method for publishing a plurality of media assets, the method comprising facilitating presentation of one or more of the media assets to a first user in accordance with a ranking of the plurality of media assets, the ranking having been computed by
    identifying text associated with each media asset, the text representing subject matter to which the associated media asset relates;
    determining data relating to current interest topics, the current interest topics data having been generated from a dynamic data set,
    wherein the dynamic data set changes over time and represents actions by a population of users involving user interactions with one or more of a search engine, a web page or a computer application, and
    wherein the current interest topics data represents a plurality of current topics of interest associated with the population of users and changes in the topics of interest over time as the dynamic data set changes over time; and
    ranking the media assets based at least in part on a comparison of the current interest topics data with the text associated with each media asset of the media assets.

18. The method of claim 17 wherein the media assets are ranked with reference to a segment of the population of users.

19. The method of claim 18 wherein demographic data represents each of the users in the population of users, wherein the segment of the population of users is determined with reference to the demographic data, and wherein presentation of the one or more of the media assets to the first user reflects first demographic data associated with the first user relating to the segment of the population.

20. The method of claim 17 wherein the media assets comprise one or more of text, audio, video, or images.

* * * * *